(12) United States Patent
Atsatt et al.

(10) Patent No.: US 8,467,218 B1
(45) Date of Patent: Jun. 18, 2013

(54) SYSTEM AND APPARATUS WITH IC RESOURCE INTERCONNECT

(75) Inventors: Sean R. Atsatt, Sana Cruz, CA (US);
Daniel R. Mansur, Emerald Hills, CA (US)

(73) Assignee: Altera Corporation, San Jose, CA (US)

( * ) Notice: Subject to any disclaimer, the term of this patent is extended or adjusted under 35 U.S.C. 154(b) by 194 days.

(21) Appl. No.: 12/966,391

(22) Filed: Dec. 13, 2010

(51) Int. Cl.
*G11C 5/06* (2006.01)

(52) U.S. Cl.
USPC .................................. 365/63; 365/230.05

(58) Field of Classification Search
USPC .............................................. 365/63, 230.05
See application file for complete search history.

(56) References Cited

U.S. PATENT DOCUMENTS

| | | | |
|---|---|---|---|
| 6,034,542 | A | 3/2000 | Ridgeway |
| 6,421,251 | B1 * | 7/2002 | Lin .............................. 361/788 |
| 7,043,595 | B2 * | 5/2006 | Kawai ........................... 710/314 |
| 7,444,454 | B2 | 10/2008 | Yancey et al. |
| 7,493,511 | B1 | 2/2009 | Yin et al. |
| 7,512,728 | B2 * | 3/2009 | Tseng ........................... 710/100 |
| 7,737,725 | B1 | 6/2010 | Ansari et al. |
| 7,844,761 | B1 * | 11/2010 | Orthner et al. .................. 710/62 |
| 7,913,022 | B1 | 3/2011 | Baxter |
| 2005/0257031 | A1 | 11/2005 | Kundu et al. |

OTHER PUBLICATIONS

U.S. Appl. No. 13/105,968, dated May 12, 2011, Atstatt et al.
U.S. Appl. No. 13/105,976, dated May 12, 2011, Atstatt et al.
"Spartan-6 FPGA Memory Controller User Guide," UG388 (v2.3) Aug. 9, 2010, 66 pp.
"Avalon Interface Specifications," version 1.2, Apr. 2009, 66 pp.
Office communication of May 18, 2012 in U.S Appl. No. 13/105,968 (including list of cited references), 9 pp.
Office communication of Jun. 19, 2012 in U.S. Appl. No. 13/105,976 (including list of cited references), 9 pp.

* cited by examiner

*Primary Examiner* — Son Dinh
(74) *Attorney, Agent, or Firm* — Law Offices of Maximilian R. Peterson

(57) ABSTRACT

Various novel aspects are disclosed by reference to an integrated circuit block that includes programmable regions, and extra-block connection pins or points with adapter circuitry, coupled by an interconnect system. Multiple independent interconnects are disclosed within the interconnect system, as are options for the composition of the programmable regions and their connectivity with the interconnect system. Adapter circuitry is disclosed that includes support for coupling extra-block memory circuits or devices using a variety of modes, protocols, and options. Modular circuit blocks provide flexibility at the interface between programmable region and fixed function circuitry.

25 Claims, 6 Drawing Sheets

SYSTEM AND APPARATUS WITH IC RESOURCE INTERCONNECT

BACKGROUND

Advances in semiconductor fabrication technologies, and the corresponding increase in transistor counts achievable within a commercially practicable integrated circuit device, have opened the door to extreme levels of functional integration. Examples include system-on-a-chip (SOC) and system-on-a-programmable-chip (SOPC's) designs. The scale of such integration can, in certain respects, however, meet diminishing returns. New approaches to intra-block and inter-block circuit interface and interaction can extend the benefit that such large scale integration has the potential to offer.

SUMMARY

In one aspect, a circuit block that may comprise all, or merely some portion, of an integrated circuit die is disclosed that includes a number of circuit regions with programmable capability, and interconnect points for extra-block connection with adapter circuitry, coupled by a novel interconnect system. In one aspect, the interconnect system includes multiple interconnect circuits that may differ in, for example, bandwidth capabilities. In one aspect, adapter circuitry includes functionality for communicating with extra-block memory circuits, with options for effecting different modes, protocols, and optimizations, for example. In other aspects, circuit regions with programmable capability include a grouping of logic cluster circuits with options for their coupling to an interconnect system. In yet a further aspect, novel circuitry for communicating with extra-block memory circuits is disclosed, such as might be employed for the aforementioned adapter circuitry, with options for effecting different modes, protocols, and optimizations, for example. In yet another aspect, novel circuitry for interfacing between programmable regions and fixed function circuit portions (for example, certain of the aforementioned adapter circuitry) is disclosed. These and other novel aspects will become evident by the descriptive material that follows.

DETAILED DESCRIPTION

Figure 1:
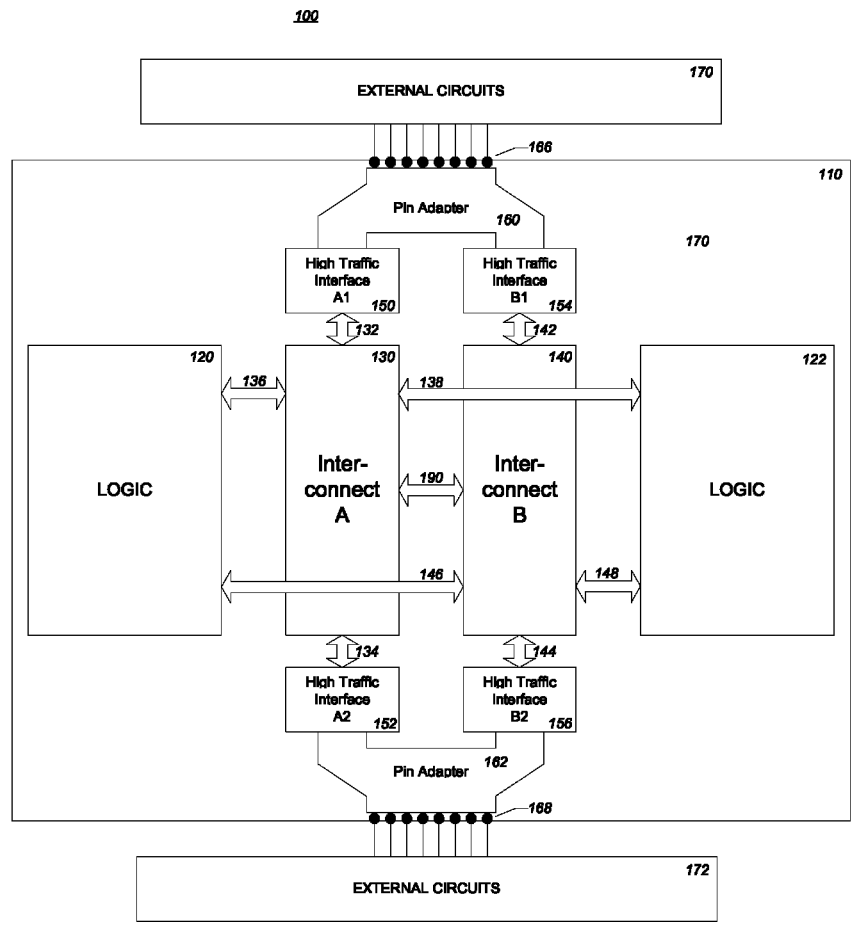
FIG. 1 is a block diagram showing a circuit with resource interconnect.

FIG. 1 is a block diagram showing a circuit with resource interconnect. Circuit 100 includes circuit block 110 and external circuits 170, 172. Each of the aforementioned may be variously implemented as an independently packaged integrated circuit or a circuit block on a larger silicon die, for example. External circuits 170, 172 are "external" to the extent that they are outside of circuit block 110. External circuits 170, 172 interface with circuit block 110 via data and control signal lines.

Circuit block 110 includes metal or electrically programmable logic circuits 120, 122, interconnect circuits 130, 140, high traffic interfaces 150-156, and pin adapter circuits 160, 162 with pins such as 166, 168. Circuit block 110 further includes circuitry for coupling these. Interconnect circuit 130 is connected to interface circuit 150 by circuit 132 and to interface circuit 152 by circuit 134. Interconnect circuit 140 is connected to interface circuit 154 by circuit 142 and to interface circuit 156 by circuit 144. The coupling circuitry may be active or passive. High traffic interface circuits 150-156 support sustained, high volume data flow with their respective interconnect circuits providing access points on the interconnects for high demand resources ("hotspots"). Memory circuits (as might be embodied in external circuits 170, 172) are one example of the kinds of resources in modern digital electronic designs that may be hotspots of interconnection activity.

Each of the interconnect circuits 130, 140 is connected to each of logic circuits 120, 122, and to one another. Circuits 136 and 138 respectively connect logic circuits 120 and 122 to interconnect circuit 130. Circuits 146 and 148 respectively connect logic circuits 120 and 122 to interconnect circuit 140. Circuit 190 connects the interconnect circuits 130, 140 to one another.

In the embodiment depicted in FIG. 1, each of the pin adapter circuits 160, 162 is connected to one of the high traffic interface circuits for each of the interconnect circuits 130, 140. Pin adapter 160 connects to interface circuit 150 for communication with interconnect A (ICA) 130, and to interface circuit 154 for communication with interconnect B (ICB) 140. Pin adapter 162 connects to interface circuit 152 for communication with ICA, and to interface circuit 156 for communication with ICB. Each of the pin adapter circuits includes a number of pins such as exemplified by pins 166 and 168. The pins serve as connection points at the logical, if not physical, edge of circuit block 110. The pins in circuit 100 (e.g., 166, 168) are shown in implementing connections between circuit block 110 and external circuits 170, 172. In one embodiment where circuit block 110 is implemented in a fully packaged, independent integrated circuit (IC), the described pins may be implemented as conventional IC package pins having associated electrical connections to an embedded silicon die. In another embodiment where circuit block 110 and external circuit blocks 170, 172 are implemented on a single silicon die, the described pins may be implemented as conventional semiconductor electrical pathways, for example, metal or polysilicon traces.

Pin adapter circuits 160, 162 are passive or active circuitry that connect (high traffic) interface circuits 150-156 to the pins of circuit block 110 for communication with external circuitry. Each of the pin adapters of circuit 100 are shown connecting two different interface circuits to a single set of pins. In one embodiment such as that depicted, each of the pin adapter circuits includes switching circuitry that provides a high degree of variability in the possible connections between the interface circuits and the associated set of pins. Selectability of the pin connections may be implemented on a pin-by-pin basis or by pin groupings. In other embodiments each interface circuit may have a dedicated pin adapter circuits and associated set of pins. The illustrated and described shared switching pin adapter circuit may, however, provide more efficient use of pin resources.

Figure 2:
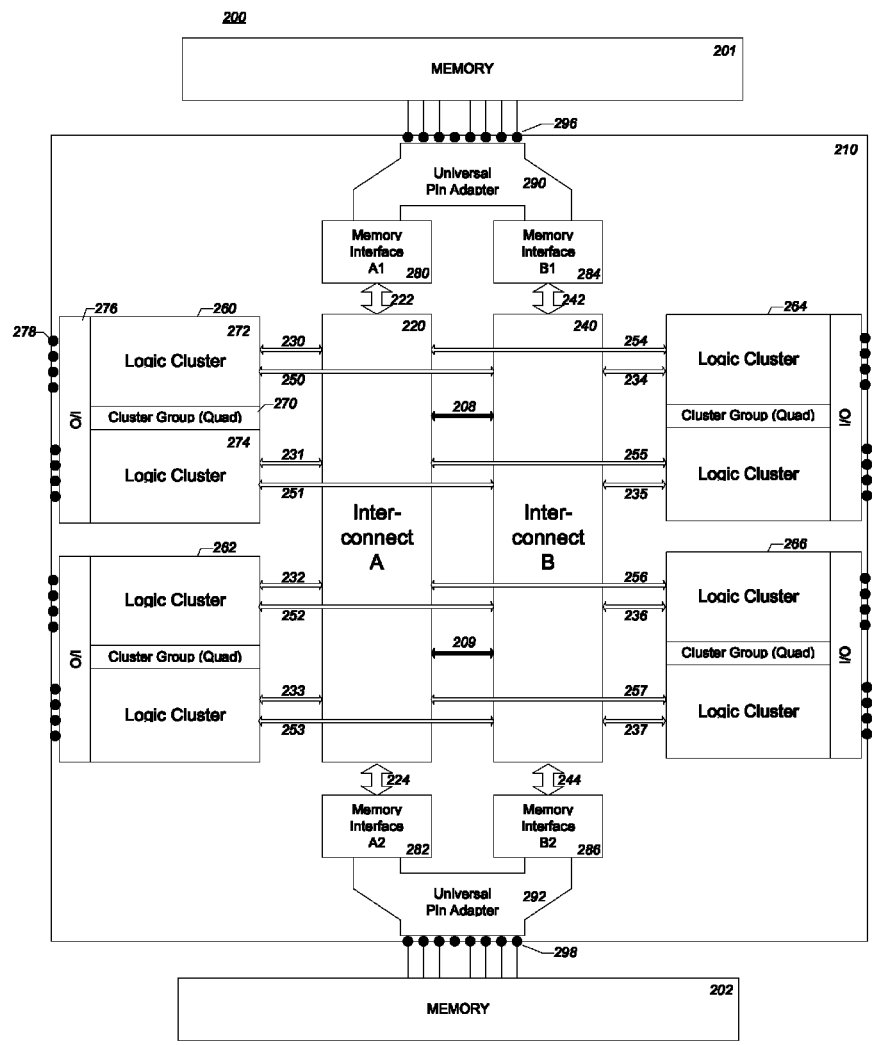
FIG. 2 is a block diagram showing a circuit with resource interconnect for clustered logic.

FIG. 2 is a block diagram showing a circuit with resource interconnect for clustered logic. One of skill in the art will appreciate the similarity and parallels between circuit 100 of FIG. 1 and circuit 200 of FIG. 2. FIG. 2 depicts a circuit embodiment where memory circuits 201, 202 are external to a programmable logic device (PLD) 210. In one embodiment, memory circuits 201, 202 include readily available memory modules that plug into standardized sockets and operate according to a published memory specification, such as DDR (1, 2, 3), QDR(II), or RLDRAM(II, III), for example. In another embodiment, memory circuits 201, 202 include memory ICs (or die portions) that operate according to a memory specification, such as RLDRAM(II,III)), for example. PLD 210 in one preferred embodiment discussed in relation to FIG. 2 is a field programmable gate array (FPGA)-type integrated circuit (or die portion).

PLD block 210 includes logic circuits 260-266, interconnect circuits ICA (220) and ICB (240), memory interface circuits 280-286, and universal pin adapter circuits 290, 292 with pins such as 296, 298. Each of logic circuits 260-266 further includes two logic cluster circuits, cluster group circuitry, I/O circuitry, and related pins. For example, logic circuit 260 includes logic cluster circuits 272, 274, cluster group circuitry 270, I/O circuitry 276, and a plurality of pins exemplified by pin 278. In one embodiment, a logic cluster such as 272 includes a substantial proportion of circuitry implementing an FPGA fabric. FPGA fabric, as used here, refers to a patterned layout of circuit blocks including a large proportion of programmable logic elements, interconnectable with an overlay of programmable signal routing resources. The fabric pattern often employs a small number of block designs with a large amount of repetition in one or both directions. In addition to the programmable logic elements, certain blocks within the fabric pattern may provide specialized, high performance functionality, for example, multiply-and-accumulate or memory functions. The process of programming the programmable logic elements and other fabric circuitry to implement a user functional design, for operation, is referred to herein as configuration. In one embodiment, as part of a power-on or reset operation, the contents of an external nonvolatile memory device such as a ROM, EEPROM, flash memory, or the like, it is read by circuitry of PLD block 210 and stored into configuration memory elements in the block. The values stored in the configuration memory elements control switches such as pass transistors which control operational circuit functions. Such configuration of PLD's is known in the art.

Cluster group circuitry such as 270 permits multiple logic clusters (such as 272 and 274) to operate as a cohesive unit, may permit logic clusters in the group to be isolated from one another for independent operation, and provides common and control functions for the logic cluster group, for example, clock selection and distribution. The PLD circuit 210 of FIG. 2 contains 8 logic clusters organized into 4 cluster groups (each a "quad"). Each logic circuit Quad has associated I/O circuitry for interfacing the Quad with circuitry external to PLD 210. For example, Quad 260 includes I/O circuitry 276 for interfacing to circuitry external to PLD 210 via pin connections as exemplified by pin 278. The I/O circuitry may include circuitry supporting a variety of support functions such as drivers, buffers, filters, serialization/deserialization, and the like for a variety of signaling schemes such as LVTTL, LVCMOS, PCI, SSTL, HSTL, differential SSTL, LVDS, transceivers and the like. The I/O circuitry and pins associated with a Quad may be associated with particular logic clusters in the Quad on a shared or dedicated basis.

Each of the universal pin adapters 290, 292 is associated with a fixed set of external connection pins and two memory interface circuits, one memory interface circuit associated with ICA and one with ICB. A universal pin adapter circuit allows a common set of the external connection pins to support a specified universe of memory interface signaling standards. For example, in one user configuration of PLD circuit 210 universal pin adapter 290 may connect the pins to the memory interface circuitry in an arrangement supporting multiple RLDRAM II or III external circuits or a custom DRAM device with high bank count in the same package. In contrast, in a second user configuration of PLD circuit 210 universal pin adapter 290 may connect the pins to the memory interface circuitry in a an arrangement supporting one 72-bit DDR3 RDIMM external circuit. In one embodiment of PLD circuit 210 each of the universal pin adapter circuits provides connections for a pool of up to 180 pins to effect up to two 36-bit, or one 72-bit, DDR DRAM, RLDRAM, AMBA (Advanced Microcontroller Bus Architecture), or OCP (Open Core Protocol) socket connection(s). Further to this embodiment, AMBA or OCP interface implementations may have the data pins multiplex and operate at double data rate to reduce the pin count. In one embodiment, the universal pin adapter is additionally enabled to connect to a customer DRAM device through an optimized IO buffer in a multi-device package. One of skill in the art will appreciate that external pin connections associated with a universal pin adapter that are unneeded for memory interface in a particular user configuration may be adapted for alternate use as an external pin connection, for example, by a logic Quad. Such adaptation is not illustrated in FIG. 2 to avoid burdening the diagram with excessive detail.

Interconnect circuits ICA 220 and ICB 240 each include signal pathways that traverse PLD 210 and associated access point circuitry providing multipoint connectivity to the signal pathways. In one embodiment the signal pathways largely include passive circuitry of a number of parallel metal traces traversing the die area of PLD 210. Access point circuitry includes active circuit elements that mediate the signal pathways (that provide the communications backbone) with other circuitry that uses the communications capability provided by the backbone. ICA and ICB do not need to provide identical communications capability or resources. In one preferred embodiment, ICA includes a relatively large number of parallel signal pathways that, in combination with a low-overhead protocol, provides extremely efficient, high-bandwidth data transfers. In that same embodiment, ICB includes a smaller number of parallel signal pathways that conserves resources but provides more limited communications bandwidth. In a preferred embodiment of PLD circuit 210 a primary user circuit functionality, such as video transcoding, can sustain operation at maximum design throughputs using ICA, uninterrupted by secondary functionality, such as statistical logging, test functions, or partial reconfigurations of the programmable logic, that can be efficiently conducted using ICB.

Multipoint access to the resource interconnect circuits, ICA and ICB, of FIG. 2 is depicted by access point Port circuitry. Port circuitry is provided as follows. Each logic cluster in each Quad is ported to each of the two interconnects. Logic cluster 272, for example, connects to ICA via Port circuit 230 and to ICB via Port circuit 250. Similarly, logic cluster 274, the second two logic cluster circuits in Quad 260, connects to ICA via Port 231 and to ICB via Port 251. Each memory interface circuit is ported to one interconnect. Memory interfaces A1 (280) and A2 (282) connect to ICA via ports 222 and 224, respectively. Similarly, memory interfaces B1 (284) and B2 (286) connect to ICB via ports 242 and 244. Further, ICA and ICB are connected to one another via two (bidirectional) Port circuits 208 and 209. Active circuit elements of the Port circuits may be variously distributed on the die. For example, active circuit elements for a logic cluster port may reside physically in or near the logic cluster circuit, in or near the interconnect signal pathways, or both.

One of skill will appreciate the many scalability options and other variations that may be employed in the implementation of a PLD such as 210. For example, the number of logic clusters or logic circuits (cluster groups) could be scaled in some proportion to the die size. Or, for another example, the size of the clusters or cluster groups could be scaled in some proportion to the data width of one or more interconnect circuits. Cluster size and composition, cluster group composition, data path widths, and numbers of logic clusters per logic circuit, ports per cluster, interconnect circuits, hotspot interfaces per interconnect circuit, are all examples of PLD design aspects that could be scaled on a freeform or formulaic basis.

Figure 3:
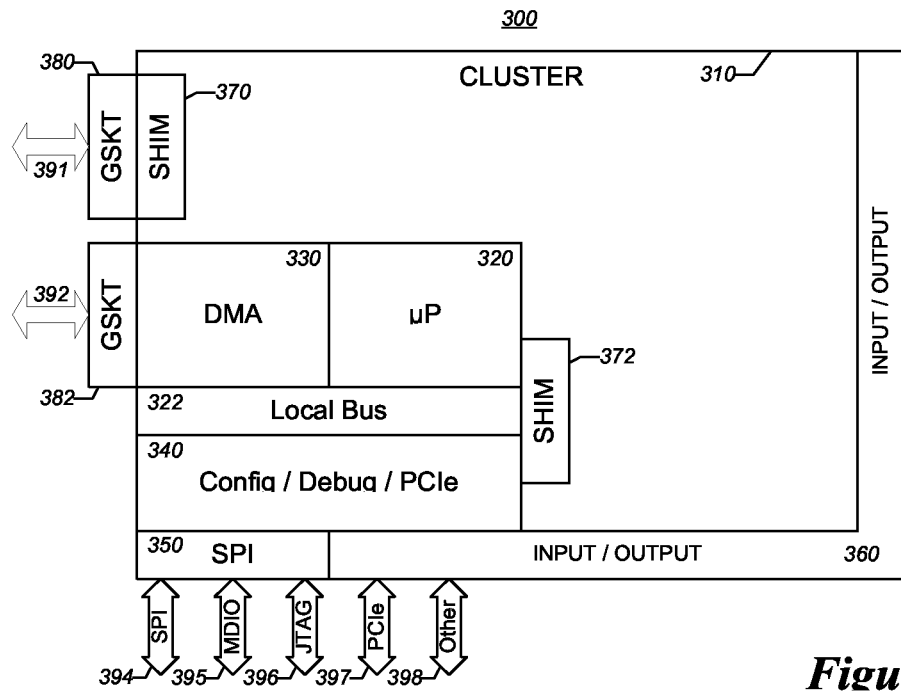
FIG. 3 is a block diagram of a first logic cluster embodiment.

FIG. 3 is a block diagram of a first logic cluster embodiment. Logic cluster 310 is a control cluster embodiment. In a PLD circuit such as 210 of FIG. 2, one control cluster may be implemented. Control cluster 310 of FIG. 3 is shown having advanced dedicated circuitry that can provide advanced chip function and control. The advanced circuitry, however, is preferentially omitted from other logic clusters in the PLD embodiment of FIG. 2 to maximize die space available for user configurable logic. Cluster 310 of FIG. 3 includes a preponderance of FPGA circuit fabric for user configurable logic functions. Cluster 310 further explicitly includes microprocessor block 320, DMA circuit 330, local bus 322, support circuitry 340, SPI interface 350, and I/O circuitry 360. Cluster 310 also explicitly includes shim circuits 370 and 372 which are implemented in one embodiment using the general circuitry of the FPGA fabric. Additional circuitry is shown in circuit 300 to provide certain context information for cluster circuit 310. Circuit 300 further includes gasket circuits 380, 382, connections to resource interconnect circuitry 391, 392, and various external connections 394-398.

Microprocessor block 320 includes dedicated circuitry for a microprocessor core and associated instruction and data memory. In one embodiment the microprocessor block 320 is an ARM core with 32 kbytes of instruction and 32 kbytes of data memory. (ARM core refers to the commercially available and widely known line of processor core designs by ARM Inc.) The microprocessor core may access additional memory including, for example, external memory such as memory devices 201, 202 of FIG. 2. DMA (direct memory access) circuit 330 of FIG. 3 is dedicated circuitry for supporting DMA access, control, and configuration functions. DMA circuit 330 communicates with microprocessor 320 using local bus 322. In one embodiment, local bus 322 implements a standard AMBA (Advanced Microcontroller Bus Architecture) bus widely used for such on-chip buses. DMA circuit 330 communicates with external memory through gasket circuit 382. Gasket circuit 382 implements transport level protocol support for communications over a resource interconnect such as ICB of FIG. 2. In one embodiment, gasket circuit 382 of FIG. 3 implements a standard OCP or AMBA transport layer. The connection between gasket circuit 382 and the resource interconnect is indicated by 392.

Circuit block 340 includes dedicated circuitry for performing chip support and utility functions. For example certain circuitry of circuit 340 performs a boot up configuration process at power up or on a full PLD reset (CONFIG). In one embodiment, CONFIG includes state machine circuitry sufficient to read configuration data from a nonvolatile memory and load it into the PLD configuration memory. In another embodiment, CONFIG performs bootstrap operations that permit microprocessor 320 to begin execution and take over the chip initialization and configuration process. Circuit block 340 further includes circuitry dedicated to debugging functions (DEBUG). The DEBUG circuit facilitates the communication of internal chip circuitry with external testing and debugging apparatus via, for example, JTAG connection 396. Circuit block 340 also includes circuitry to provide a standard PCIe external bus interface via, for example, PCIe connection 397.

I/O circuitry 360 provides interfacing between circuitry of the cluster and connection pins for attachment to external circuitry. I/O circuitry 360 in one embodiment includes programmable I/O circuitry controlled by stored configuration memory values to effect different connection standards such as those for LVTTL or LVDS, for example. I/O circuitry 360 can provide a variety of I/O adaptations such as buffering, driving, or voltage shifting, as examples. The interfacing options may be uniform for all pins connected by I/O circuitry 360 or may vary on a pin-by-pin or group-by-group basis. SPI block 350 interfaces between circuitry of the cluster and connection pins for attachment to external circuitry as does I/O circuitry 360. SPI circuitry 350, however, specifically implements adaptations and signaling to effect communications in accordance with SPI (serial peripheral interface) standards. I/O circuitry 360 and SPI circuitry 350 give cluster 310 the ability to interface with external circuitry and apparatus via pin connections such as those indicated by connections 394-398. One of skill in the art will appreciate that such connections may require as few as one, or a greater number of pins to implement.

Cluster 310 is further shown including shims 370, 372. In one embodiment shim circuits 370, 372 are not implemented as dedicated circuits but rather are configured into the general purpose logic circuitry of the FPGA fabric. Accordingly, for such an embodiment, cluster 310 (as depicted in FIG. 3 showing the shims) represents a view of the cluster circuit with its programmable logic configured. (The shims would not be operationally extant in the unconfigured cluster circuitry of such an embodiment.) While gasket circuits, such as 391 and 392, implement a transport level in a communications protocol as earlier discussed, shim circuits 370, 372 implement a transaction level in the communications protocol stack. Accordingly, general purpose logic circuitry in a cluster configured to perform user functions can interface with a shim circuit to exchange transaction format data. The shim circuit interfaces with a gasket circuit to exchange transport format data, perform data width translation, and perform clock domain crossing. The gasket circuit interfaces with the resource interconnect to convey the transport format data. In one preferred embodiment the gasket implements an AXI-compliant interface to transport data. (AXI refers to the Advanced eXtensible Interface, AMBA specification, from ARM Ltd., Cambridge.) The shim provides flexibility by implementing different transaction types in the programmable logic. The different transaction types might be marked by differences in data widths, burst size, in-order requirements, and split transaction capability, for example.

Figure 4:
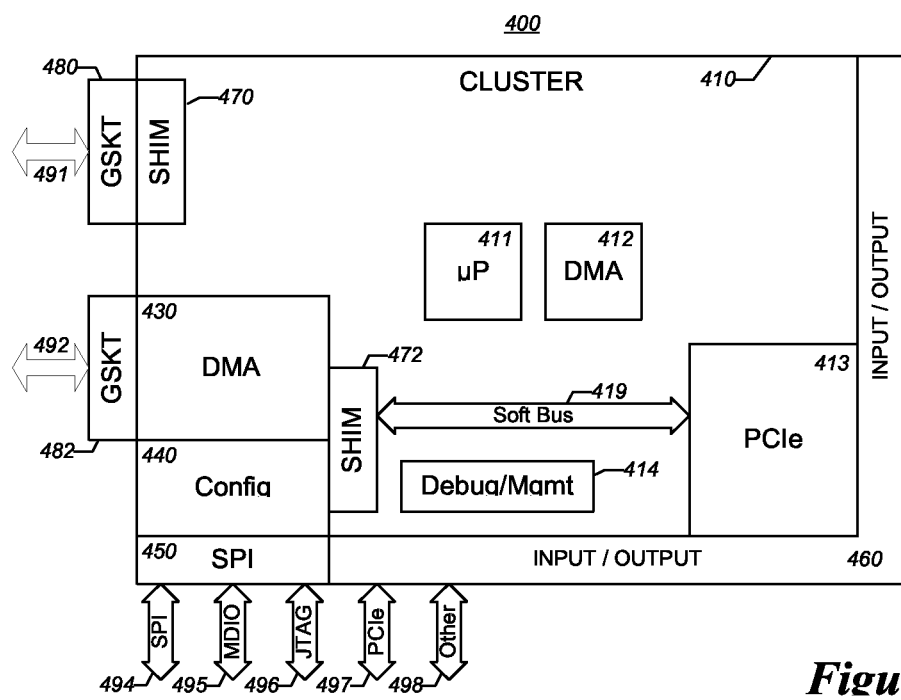
FIG. 4 is a block diagram of a second logic cluster embodiment.

FIG. 4 is a block diagram of a second logic cluster embodiment. Logic cluster 410 is a lean cluster embodiment with less dedicated circuitry than cluster 310 of FIG. 3. In one preferred embodiment of a PLD circuit (such as 210 of FIG. 2), all logic cluster circuits except for one control cluster are implemented using a lean cluster embodiment such as cluster 410 of FIG. 4. Circuit blocks 450, 460, 470, 472, 480, and 482 of FIG. 4 correspond to circuit blocks 350, 360, 370, 372, 380, and 382 of FIG. 3, respectively, and descriptions will not be repeated here. Similarly, connections 491, 492, and 494-498 of FIG. 4 correspond to connections 391, 392, and 394-398 of FIG. 3, respectively, and descriptions will not be repeated here. Cluster circuit 410 of FIG. 4 includes a preponderance of FPGA circuit fabric for user configurable logic functions.

Cluster circuit 410 of FIG. 4 includes hard logic blocks (dedicated circuitry) DMA 430, support circuitry 440, SPI I/O 450, and I/O 460. (Gasket circuit blocks 480 and 482, shown outside cluster circuit 410, are also hard logic blocks.) Cluster circuit 410 of FIG. 4 includes soft logic blocks (circuit blocks implemented using the general-purpose programmable logic resources of the cluster) microprocessor 411, supplemental DMA 412, PCIe 413, supplemental support 414, soft bus/channel 419, and shims 470, 472. Accordingly, cluster 410 (as depicted in FIG. 4 showing the soft logic blocks) represents a view of the cluster circuit with its programmable logic configured. (The soft logic blocks would not be operationally extant in the unconfigured cluster circuitry.) The soft logic blocks of cluster 410 are for purposes of illustration and show example uses. The choice of soft logic blocks that are configured is dependent on the particular user design being implemented using the PLD of which cluster 410 is a part. The depicted soft logic blocks are illustrated here to help convey an understanding of the use and usefulness of subject matter disclosed herein.

DMA block 430 of cluster 410 corresponds to DMA block 330 of FIG. 3. DMA block 430 of FIG. 4 may have more limited or application-specific functionality than that of DMA block 330 of FIG. 3 in keeping with the "lean" or specialized design theme of cluster 410 of FIG. 4. Additional DMA functionality can be configured into the general-purpose logic of cluster 410 as indicated by soft logic DMA block 412.

Support circuitry block 440 is shown to be a reduced functionality version of the support circuitry block 340 of FIG. 3. Support circuitry block 440 of FIG. 4 includes only the configuration (CONFIG) functionality described in relation to support circuitry block 340, and then in one preferred embodiment, only to the extent that it can effect the configuration operation for the cluster to which it belongs and directly related circuitry. In other embodiments the configuration support circuitry within the cluster may be reduced or eliminated altogether by moving some or all of that functionality up to the cluster group (quad) level, for example, by including it in circuit block 270 of FIG. 2. Chip management functions, such as the debug function described in relation to support block 340 of FIG. 3, and data transfer functions, such as the PCIE capability described in relation to support block 340, are omitted from hard logic block 440 of FIG. 4 but may be implemented as needed for a user design by using programmable logic resources as indicated by soft logic blocks 414 and 413, respectively.

Support circuitry of block 400, as compared to block 300, offers more flexibility of processor selection, DMA features, or IO types, to configure and manage a larger FPGA, for example. Support circuitry of blocks 300 and 400 may both provide functional circuitry for configuration, diagnostics, monitoring, performance profiling, debug, resource provisioning, error logging (including SEU errors), scrubbing, security, and the like. Support circuitry block 300, however, leans toward efficiency, while block 400 leans toward flexibility.

Figure 5:
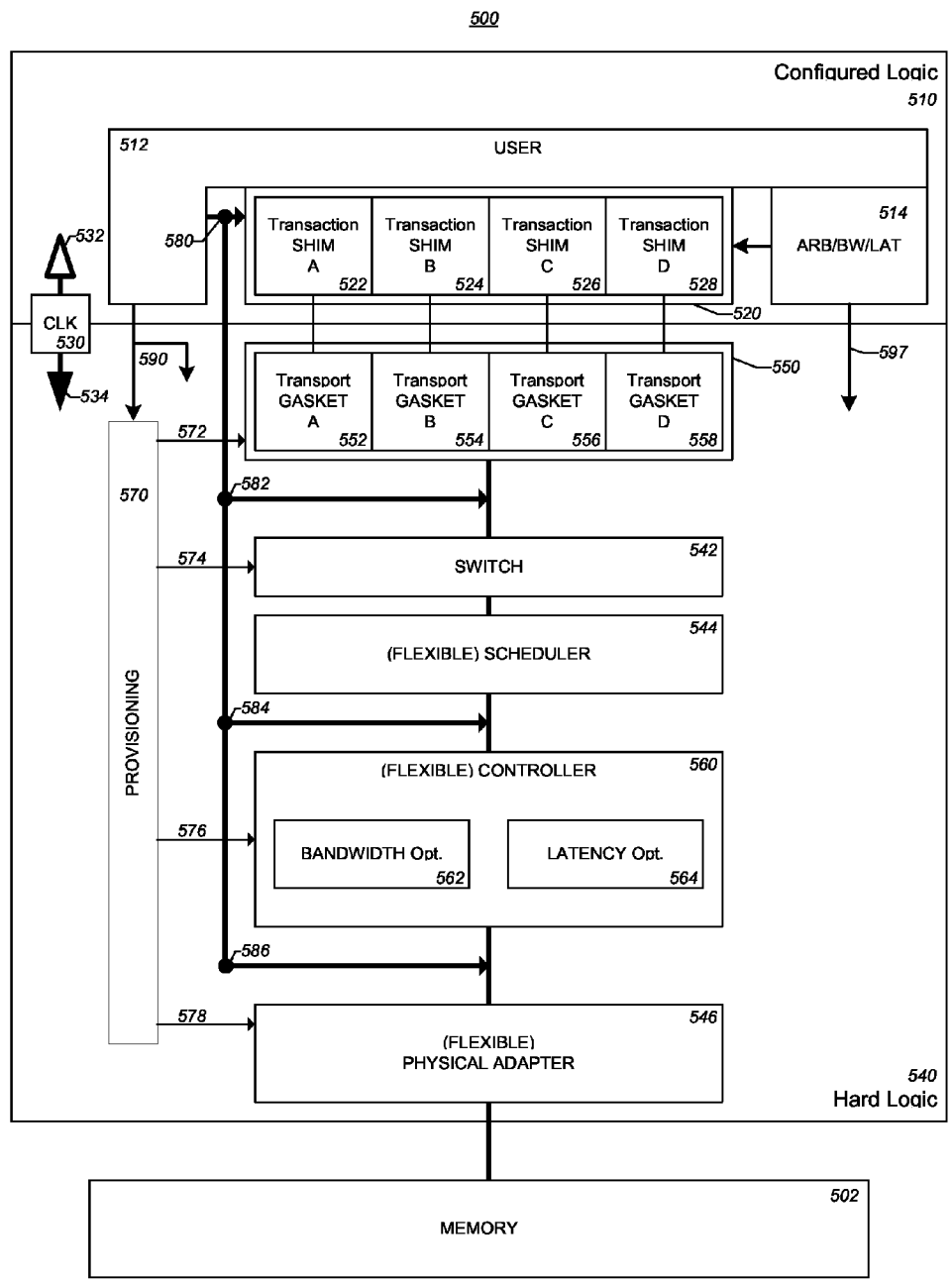
FIG. 5 is a block diagram showing circuitry for flexible memory access.

FIG. 5 is a block diagram showing circuitry for flexible memory access. Relevant portions of circuitry 500 may be utilized to implement an embodiment of a memory interface circuit in a PLD, such as memory interface circuits A1, A2, B1, and B2 (280-286) of FIG. 2, for example. Circuitry 500 of FIG. 5 includes memory circuitry 502 which corresponds to an external memory circuit block such as 201 or 202 of FIG. 2. Circuitry 500 of FIG. 5 further includes configured logic section 510 and hard logic section 540, both of which represent circuitry as may be included within a PLD circuit such as 210 of FIG. 2. Configured logic section 510 includes user function circuitry 512, shim array 520, memory support block 514, a portion of clock circuitry 530 and its connection 532 to the configured logic clock domain. Shim array 520 includes four shims designated A, B, C, and D (522, 524, 526, 528, respectively). Hard logic portion 540 includes the remaining portion of clock circuitry 530 and its connection 534 to a hard logic clock domain, Gasket array 550, switch 542, scheduler 544, controller 560, physical adapter 546, and provisioning circuitry 570. Gasket array 550 includes four gaskets designated A, B, C, and D (552, 554, 556, 558, respectively). Controller 560 includes bandwidth optimization circuitry 562 and latency optimization circuitry 564.

It is worth noting that each soft shim of array 520 faces a corresponding hard gasket of array 550 to transition a data transfer between the configured logic of section 510 and the hard logic of section 540. In one embodiment, each signal line between shim and counterpart gasket circuitry is unidirectional and designated for either data ingress, data egress, or control use. Arrays, rather than indivisible structures are described to illustrate options for flexibility. For example, such 4-plex arrays with a total data width of 128 bits could be utilized as four 32-bit, two 64-bit, or one 128-bit paths. In a PLD circuit such as used here for illustration, flexibility in the soft-hard transfer interface circuitry increases the potential number of configured circuit designs that the IC can accommodate. Example circuitry that can accommodate a wide range of protocols (such as AMBA, AXL, AMBA, AHB Lite, Avalon MM, Avalon ST, User Proprietary Protocols, and DDR controller signaling) and a wide range of use models (such as number of ports, number of masters, number of slaves, and data widths of ports) is discussed more fully in Appendix I, entitled "Composable HW Interface." While Appendix I describes a robust interface using a set of low level interface units, one of skill recognizes that lesser or different interfaces can be implemented that still take advantage of the subject matter disclosed herein.

User function circuitry 512 in one embodiment includes general-purpose programmable logic circuitry of a PLD that is configured to implement user-desired logic processing. In a PLD circuit embodiment such as 210 FIG. 2, the four logic quads 260, 262, 264, 266 might together correspond to user logic block 512 of FIG. 5.

Technological constraints often limit the maximum speed at which the general-purpose logic circuits of a PLD such as those represented by block 512 can operate. Often that maximum speed is lower than the operating speeds of memory devices such as represented by block 502. Circuitry 500 includes circuit functionality and adaptations to accommodate such speed differences. Clock circuitry 530 is clock domain crossing circuitry to interface higher-speed hard logic and memory clock system 534 with lower-speed configured logic clock system 532. Interface functions performed by clock domain crossing circuitry 530 include clock shifting and synchronization. Moreover, switch circuit 542 and the 4-wide Gasket array 550 together permit full rate dataflow through the hard logic to be distributed to (or aggregated from) four quarter-rate data channels. Accordingly, configured logic can operate at the slower quarter-rate speed while interfacing with the memory operating at full bandwidth.

In addition to its connection with Gasket array 550, switch circuit 542 has a downstream connection (toward the memory) with scheduler circuit 544. Scheduler circuit 544 adds intelligence to maximize memory utilization by viewing upstream activity. The scheduler circuit performs this function by analyzing the memory interactions and the characteristics related to the upstream memory users, for example, service threads implemented in user logic 512. Scheduler 544 has a downstream connection to controller circuit 560.

Dedicated memory controller circuit 560 receives requests as prioritized by scheduler 544. Memory controller 560 adds intelligence to maximize memory utilization by viewing downstream activity in light of the capabilities, configuration, and state of memory 502. For example, controller 560 may service the next request based on the availability of an open bank. Accordingly, the requests already prioritized by the scheduler are now optimally serviced in light of the memory capabilities.

In one embodiment memory controller circuit 560 includes circuit portions optimized for different memory interfacing priorities and techniques. For example, controller 560 may have bandwidth optimized circuit portion 562 useful for interfacing with certain memory types such as DDR3 and latency optimized circuit portion 564 useful for interfacing with certain other memory types such as MBRAM.

Memory controller 560 has a downstream connection to physical adapter 546. Physical adapter 546 may include active and/or passive circuitry conveying signals from controller 562 to external connection pins for attachment to memory. Physical adapter 546 generally corresponds to pin adapters 160, 162 of FIG. 1, and to universal pin adapters 290, 292 of FIG. 2.

The memory access circuitry just described in relation to circuit 500 provides robust capabilities. When implemented as part of a PLD, not all of the functionality may be required for all user designs. Circuitry 500 depicts a robust set of bypass options to provide improved flexibility in implementing memory access in a user design. The user circuitry 512 generates the memory accesses represented here by the heavy line extending from user block 512 (and toward route point 580). Circuitry is provided within circuit 500 to route appropriate request signaling from user logic 512 to any of Shim array 520 as indicated by routing point 580, switch/scheduler (542/544) input as indicated by routing point 582, controller 560 input as indicated by routing point 584, or physical adapter 546 as indicated by routing point 586. One of skill in the art will understand that the aforementioned bypass routing options are illustrated conceptually in FIG. 5, and that signaling representing the memory access could take different forms depending on the routing point effectively chosen in the user design, i.e., it is not simply a matter of switching a common set of signals to different points. For example, the number, timing, values, and composition of a set of signals from user logic 512 for memory access would likely be different if those signals were directed to physical adapter 546 than if those signals were directed to switch 542 or controller 560.

It addition to the connections between configured logic and hard logic for conveying memory access request signals, connections for certain control functions may connect configured logic circuitry with hard logic circuitry. This is illustrated in circuit 500 by, for example, control signal path 590 that connects circuitry within user block 512 with control or utility circuitry included in the hard logic. An illustrative example is provisioning circuitry 570. Provisioning circuitry 570 is supplied to allow user logic to make allowable provisioning changes for selectable operational options supported by the circuitry of the hard logic blocks. For example, in response to a control signal 590 from user logic 512, provisioning circuitry 570 can provision the switch 542 to operate as any of a 1:1, 2:1, or 4:1 switch via control signals depicted by arrow 574. In an embodiment where provisioning circuitry such as 570 is not included, provisioning selections for the hard logic blocks can be made configurable, i.e., controlled by configuration memory elements that are loaded during the configuration process. In another embodiment, provisioning of the hard logic blocks is achieved as a combination of user logic signals for dynamically alterable provisions and configuration elements for static provisions.

Operational, as well as provisioning, control signals may traverse the configured logic-hard logic boundary. Configured logic block 514 is an example where memory arbitration, bandwidth, and latency control circuitry can be highly tailored to the specific needs of a particular user design by implementing that circuitry using the general-purpose programmable logic. The soft control block 514 can communicate with other soft logic blocks (for example, 520) and with hard logic blocks (for example, controller 560) to implement memory interface functionality considered most advantageous to a particular user design.

Figure 6:
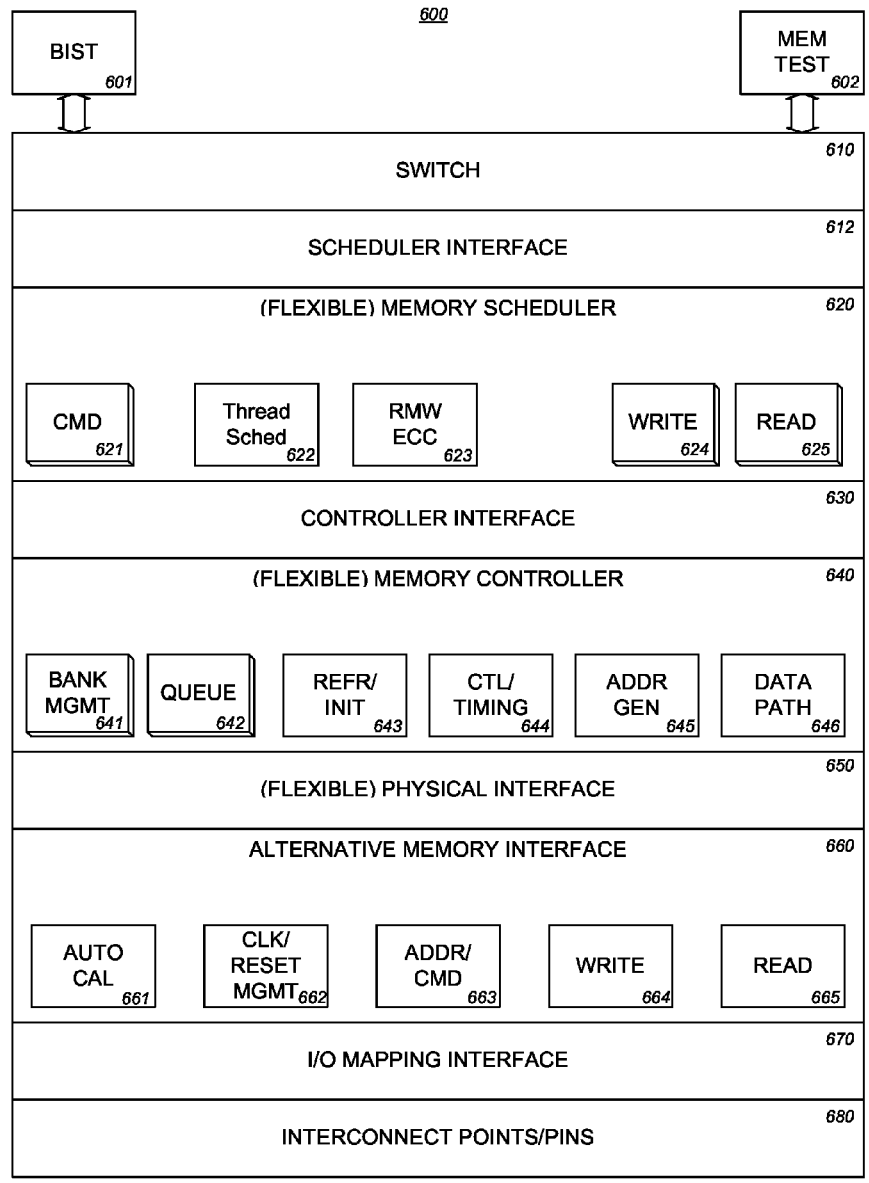
FIG. 6 is a block diagram of a memory interface circuit "stack" in one embodiment.

FIG. 6 is a block diagram of a memory interface circuit "stack" in one embodiment. Circuitry 600 of FIG. 6 may be used to implement memory access circuitry such as that shown in FIG. 2. Circuit blocks of FIG. 6 in the range of 610-665 can implement a memory interface circuit such as 280 of FIG. 2. Circuit blocks 670 of FIG. 6 corresponds to a universal pin adapter (e.g., 290) of FIG. 2. Circuit blocks 680 of FIG. 6 corresponds with the associated pins of FIG. 2 (e.g., 296). Circuit blocks 610 through 680 of FIG. 6 are implemented as dedicated (hard logic) circuitry. Built-in self test block 601 and memory test block 602 may be implemented as hard logic, soft logic, or a combination of the two. Switch 610 of FIG. 6 corresponds to switch 542 of FIG. 5 and functions the same.

In one embodiment, flexible memory scheduler block 620 is a MemMax memory scheduler circuit implemented from the MemMax product line of Sonics, Inc., Mountain View, Calif. Custom circuitry or other commercially available schedulers could also be used. Flexible scheduler block 620 corresponds to scheduler 544 of FIG. 5. Scheduler interface 612 of FIG. 6 interposes between switch 610 and memory scheduler 620. In one embodiment, scheduler interface 612 implements a slave interface conforming to OCP specifications. In another embodiment, scheduler interface 612 implements a slave interface conforming to multiple interconnect standards including AMBA, Avalon, Avalon Streaming and/or customer proprietary specifications. In one embodiment, the scheduling interface can support multiple interconnect protocol standards concurrently, efficiently transfer a variety RAM burst lengths and can provision bandwidth verses latency during run time operation.

Another interface, the controller interface 630, follows memory scheduler 620. In one embodiment, controller interface 630 implements a master interface conforming to OCP specifications. In another embodiment, controller interface 630 implements a single slave conforming to AMBA specifications with logic directly from the user logic, bypassing the scheduling logic and optimizing for latency. Implementations of a scheduler interface circuit and a controller interface circuit are available in conjunction with the MemMax scheduler example previously mentioned. Memory scheduler 620 includes command 621, write 624, and read 625 buffers. Memory scheduler 620 further includes read-modify-write and error correction circuitry 623, and thread scheduler circuit 622. The scheduler circuit may function by filtering through a list of outstanding requests. Requests may be filtered against multiple criteria to determine the next request to be serviced. Examples of filter criteria for scheduling include bank busy conditions, locked conditions, quality of service (QOS) parameters, data bus turned-around, and least recently serviced information. In one embodiment, the schedule can be dynamically or statically provisioned to manage both DDR3 request and alternative DRAM with addition memory banks and/or different memory commands.

Flexible memory controller 640 follows controller interface 630. Flexible memory controller 640 corresponds to controller 560 of FIG. 5. Flexible memory controller 640 of FIG. 6 includes bank management 641 and queue 642 buffers. Memory controller 640 further includes refresh and initialization circuit 643, control and timing circuit 644, address generation circuit 645, and data path circuit 646. Memory controller circuits are well understood in the art. Flexible memory controller 640 can be dynamically or statically provisioned for multiple types of RAM technologies with a different set of command options. In one embodiment, the flexible memory controller 640 can support DDR3 and DDR2 which requires specific bank management state machine and the logic provisioning can be altered to also support RLDRAM3 requiring alternative bank management state machine with a different set of commands. In another embodiment, the bank management 641 can manage 8 banks found in DDR3 and 100 to 500 banks in a custom DRAM interconnect through the same Flexible Physical Interface 660. In addition, this embodiment has different provisioning for the Queue 642, Initialization 643, and Control 644 due to the diversity of the number of banks and commands. Memory controller 640 is followed by flexible physical interface 650.

Flexible physical layer memory interface 660 follows interface 650 and functions to particularly adapt memory access requests from memory controller 640 to a particular type of memory device. Accordingly, the memory access requests from memory controller 640 can be adapted for service by a memory device that may vary from possible alternative devices for any number of characteristics such as width, density, bandwidth, and signaling, for example. Alternative memory interface 660 includes automatic calibration circuit 661, clock and reset management circuit 662, address and command circuit 663, write circuit 664 and read circuit 665. Automatic calibration circuit 661 dynamically and statically adjusts the interconnect points or pins 680 to compensate for variations in process, temperature and voltage. Clock and reset management circuit 662 insure the appropriate command write and data have been captured across the clock boundary between the different devices or circuitry. Address and command circuit 663 initiates and captures commands to a variety of external RAM structures including DDR3 and customer RAM devices. Write circuit 664 and read circuit 665 provide the data path to and from the RAM devices. The write circuit 664 and the read circuit 665 can be configured to support a unified data path similar to DDR3 or segregated data path to a user RAM device with more interconnect points or pins of block 680. I/O mapping interface circuit 670 follows alternative memory interface 660 to connect its particularized signal pattern to the appropriate pins of block 680.

Figure 7:
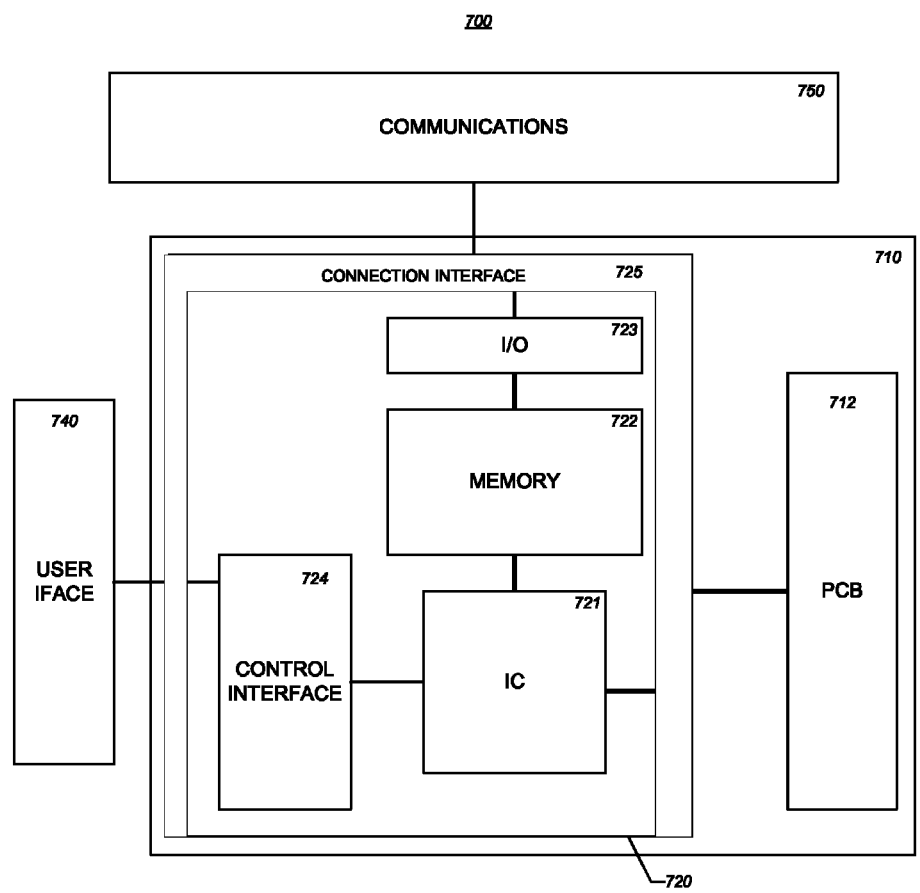
FIG. 7 is a block diagram of a system employing an IC with resource interconnect.

FIG. 7 is a block diagram of a system employing an IC with one or more aspects of the novel subject matter disclosed. System 700 includes primary device 710, user interface device 740, and communications device 750. Primary device 710 includes circuit card 720 and printed circuit board 712. Circuit card 720 includes IC 721, memory module 722, I/O circuitry 723, control interface 724, and connection interface 725. One of skill in the art understands that system 700 of FIG. 7 is only one example for illustration of the many kinds of electronic devices, apparatus, and systems that could advantageously employ an integrated circuit with one or more novel aspects disclosed herein.

In one embodiment, circuit card 720 is a printed circuit board with circuit components and connectors attached thereto. In one embodiment, circuit card 720 includes a main printed circuit board and a daughterboard for memory module 722. IC 721 in one embodiment is an integrated circuit implementing a PLD circuit design such as 210 of FIG. 2 that includes both advanced resource interconnect circuitry and advanced memory interfacing capability. Memory interfacing circuitry of IC 721 of FIG. 7 connects to memory module 722. I/O circuitry 723 also connects to memory 722. Connection interface 725 may include active and/or passive components, including connectors, used to connect mainboard 720 with off-board circuitry and devices. Printed circuit board 712 includes additional circuitry for device 710 that is not or cannot be located on primary circuit board 720 or it's daughterboard. User interface device 740 includes display and/or user input devices, such as buttons, keyboards, and a mouse, permitting device 710 to interact with a human user.

In one embodiment, device 710 is a video image processor that receives digitized video data in real-time and converts it to a secondary format. In such an embodiment communications circuit 750 is a receiver that receives and demodulates a digital video signal. The demodulated digital video signal is carried to I/O circuit 723 via connection interface 725. I/O circuit 723 places the digital video signal data into memory 722, interleaving its accesses to the memory with those of IC 721. IC 721, in part based on control information entered by a user on user interface 740 and communicated to IC 721 through control interface 724, reads the digital video signal information from memory 722, isolates individual images, and reformats them. Reformatted video may then be displayed on user interface 740. One of skill will appreciate the illustrative example of system 700 and the countless other possibilities made possible by the novel subject matter disclosed herein.

While the preceding description has often made use of illustrative PLD embodiments to help explain novel subject matter, one of skill understands that certain disclosed subject matter may be implemented as part of any IC that supports configuration. Such configuration may be accomplished via data stored in programmable elements on the IC. Programmable elements may include dynamic or static RAM, flip-flops, electronically erasable programmable read-only memory (EEPROM) cells, flash, fuse, anti-fuse programmable connections, or other memory elements. Configuration may also be accomplished via one or more externally generated signals received by the IC during operation of the IC. Data represented by such signals may or may not be stored on the IC during operation of the IC. Configuration may also be accomplished via mask programming during fabrication of the IC. (While mask programming may have disadvantages relative to some of the field programmable options already listed, it may be useful in certain high volume applications.) Accordingly, the illustrative PLD's are merely specific examples of IC's that support configuration. PLD's (also referred to as complex PLDs, programmable array logic, programmable logic arrays, field PLAs, erasable PLDs, electrically erasable PLDs, logic cell arrays, field programmable gate arrays, or by other names) provide the advantages of fixed ICs with the flexibility of custom ICs. PLDs have configuration elements (i.e., programmable elements) that may be programmed or reprogrammed. Placing new data into the configuration elements programs or reprograms the PLD's logic functions and associated routing pathways. Accordingly, one of skill appreciates that the inventive subject matter extends far beyond the details of particular embodiments used for illustration herein, and extends to the full breadth of the claims that follow.

The invention claimed is:

1. A circuit block for an integrated circuit, comprising:
   a plurality of programmable regions;
   a pin adapter circuit coupled to a plurality of pins for connection to external circuitry;
   a first interconnect having a first primary port and a first plurality of secondary ports, said first plurality of secondary ports coupled to said plurality of programmable regions, and said first primary port coupled to said pin adapter circuit;
   a second interconnect having a second primary port and a second plurality of secondary ports, said second plurality of secondary ports coupled to said plurality of programmable regions, and said second primary port coupled to said pin adapter circuit;
   wherein said second interconnect is characterized by a bandwidth no greater than that of said first interconnect.

2. The integrated circuit of claim 1 wherein said pin adapter circuit comprises a memory controller circuit.

3. The integrated circuit of claim 2 wherein said pin adapter circuit further comprises a plurality of gasket circuits.

4. The integrated circuit of claim 3 wherein said memory controller circuit comprises a latency optimizing circuit and a bandwidth optimizing circuit.

5. The integrated circuit of claim 1 wherein each of said programmable regions comprises a plurality of logic cluster circuits, and cluster group circuitry coupled to each of said plurality of logic cluster circuits in the respective programmable region.

6. The integrated circuit of claim 5 wherein at least one said logic cluster circuit in each of said programmable regions is coupled to a said secondary port of said first plurality.

7. The integrated circuit of claim 6 wherein at least one said logic cluster circuit in each of said programmable regions is coupled to a said secondary port of said second plurality.

8. The integrated circuit of claim 7 wherein said pin adapter circuit comprises a memory controller circuit.

9. The integrated circuit of claim 8 wherein said pin adapter circuit comprises a plurality of gasket circuits.

10. The integrated circuit of claim 9 wherein said memory controller circuit comprises a latency optimizing circuit and a bandwidth optimizing circuit.

11. The integrated circuit of claim 5 wherein each said logic cluster circuit in each of said programmable regions is coupled to a said secondary port of said first plurality and to a said secondary port of said second plurality.

12. The integrated circuit of claim 11 wherein said pin adapter circuit comprises a memory controller circuit.

13. The integrated circuit of claim 12 wherein said pin adapter circuit comprises a plurality of gasket circuits.

14. The integrated circuit of claim 13 wherein said memory controller circuit comprises a latency optimizing circuit and a bandwidth optimizing circuit.

15. The integrated circuit of claim 5 wherein at least one of said plurality of logic cluster circuits among said programmable regions is a control cluster and is coupled to a said secondary port of said second plurality.

16. The integrated circuit of claim 15 wherein said control cluster comprises a microprocessor circuit.

17. A memory interface circuit, comprising:
    an array of gasket circuits each couplable to configurable circuitry to transport a portion of a data transfer;
    a switch circuit coupled to said array and to a scheduler circuit;
    a controller circuit coupled to said scheduler circuit;
    a universal pin adapter circuit coupled to said controller circuit and to a plurality of pin connections; and
    a bypass circuit coupled to configurable circuitry and selectively couplable to said switch circuit, said controller circuit, and said universal pin adapter circuit.

18. The memory interface circuit of claim 17 further comprising a clock domain crossing circuit having a connection for a first domain associated with said configurable circuit and having a connection for a second domain associated with one or more of said gasket, switch, scheduler, controller, and universal pin adapter circuits.

19. The memory interface circuit of claim 18 further comprising provisioning circuitry coupled to circuitry of said first domain and to circuitry of said second domain.

20. The memory interface circuit of claim 19 wherein said provisioning circuitry is coupled to said array.

21. The memory interface circuit of claim 19 wherein said provisioning circuitry is coupled to said switch circuit.

22. The memory interface circuit of claim 20 wherein said provisioning circuitry is further coupled to said controller circuit.

23. The memory interface circuit of claim 19 wherein said provisioning circuitry is coupled to said controller circuit.

24. The memory interface circuit of claim 19 wherein said provisioning circuitry is coupled to said universal pin adapter circuit.

25. The memory interface circuit of claim 17 wherein said controller circuit further comprises a bandwidth optimization circuit and a latency optimization circuit.

* * * * *